US006204852B1

(12) United States Patent
Kumar et al.

(10) Patent No.: US 6,204,852 B1
(45) Date of Patent: Mar. 20, 2001

(54) VIDEO HAND IMAGE THREE-DIMENSIONAL COMPUTER INTERFACE

(75) Inventors: Senthil Kumar, Aberdeen; Jakub Segen, Fair Haven, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/208,079

(22) Filed: Dec. 9, 1998

(51) Int. Cl.[7] .................................................. G06T 15/00
(52) U.S. Cl. ............................................. 345/419; 345/433
(58) Field of Search ...................................... 345/418, 419, 345/420, 426, 427, 433, 434, 437, 438, 439

(56) References Cited

U.S. PATENT DOCUMENTS

| | | | | |
|---|---|---|---|---|
| 5,511,153 | * | 4/1996 | Azarbayejani et al. | 345/419 |
| 5,691,765 | * | 11/1997 | Schieltz et al. | 348/335 |
| 6,028,606 | * | 2/2000 | Kolb et al. | 345/419 |
| 6,028,608 | * | 2/2000 | Jenkins | 345/433 |
| 6,078,701 | * | 6/2000 | Hsu et al. | 382/294 |
| 6,097,394 | * | 8/2000 | Levoy et al. | 345/427 |

* cited by examiner

Primary Examiner—Cliff N. Vo

(57) ABSTRACT

A video gesture-based three-dimensional computer interface system that uses images of hand gestures to control a computer and that tracks motion of the user's hand or an elongated object or a portion thereof in a three-dimensional coordinate system with five degrees of freedom. The system includes a computer with image processing capabilities and at least two cameras connected to the computer. During operation of the system, hand images from the cameras are continually converted to a digital format and input to the computer for processing. The results of the processing and attempted recognition of each image are then sent to an application or the like executed by the computer for performing various functions or operations. However, when the computer recognizes a hand gesture as a "point" gesture with one finger extended, the computer uses information derived from the images to track three-dimensional coordinates of the extended finger of the user's hand with five degrees of freedom. The computer utilizes two-dimensional images obtained by each camera to derive three-dimensional position (in an x, y, z coordinate system) and orientation (azimuth and elevation angles) coordinates of the extended finger.

14 Claims, 4 Drawing Sheets

VIDEO HAND IMAGE THREE-DIMENSIONAL COMPUTER INTERFACE

BACKGROUND OF THE INVENTION

I. Field of the Invention

This invention pertains to a method and apparatus for inputting commands to a computer using hand signals. More particularly, the present invention relates to a video gesture-based computer interface wherein images of hand gestures are used to control a computer and wherein motion of the user's hand or a portion thereof is tracked in a three-dimensional coordinate system with five degrees of freedom.

II. Description of the Related Art

Various types of computer control and interface devices exist for inputting commands to a computer. Such devices may for example take the form of a computer mouse, joystick or trackball, wherein a user manipulates the interface device to perform a particular operation such as to select a specific entry from a menu of options, perform a "click" or "point" function, etc. A significant problem associated with such interface devices is that a surface area is needed for placement of the device and, in the case of a mouse, to accommodate device movement and manipulation. In addition, such interface devices are generally connected by a cable to a computer CPU with the cable typically draped across the user's desk, causing obstruction of the user's work area. Moreover, because interface device manipulation for performing operations is not consistent with common communication movements, such as the use of a pointing finger hand gesture to select a menu entry, as opposed to maneuvering a mouse until the cursor rests on the desired menu entry, a user must become comfortable and familiar with the operation of the particular interface device before proficiency in use may be attained.

To address these drawbacks, a video interface system for enabling a user to utilize hand gestures to issue commands to a computer has been developed and is described in commonly assigned U.S. patent application of Segen entitled "Video Hand Image Computer Interface", Ser No. 08/887,765 filed Jul. 3, 1997 (hereinafter "Segen"), which is hereby incorporated herein by reference in its entirety. The Segen system, by way of preferred example, utilizes a video camera or other video input device connected to an image processing computer, with the camera positioned to receive images of an object such as a user's hand. The image processing capabilities of the computer act upon predetermined recognized hand gestures as computer commands. Hand images from the camera are converted to a digital format and input to the computer for processing. The results of the processing and attempted recognition of each image are sent to an application or the like for performing various functions or operations.

However, the use of both traditional two-dimensional input devices and the Segen system is problematic in advanced computer-based three-dimensional object selection and manipulation applications. In such applications, a virtual three-dimensional environment is typically displayed to the user with one or more displayed virtual objects and command menus positioned within the virtual environment. The user may delete, move and otherwise change the objects in the virtual environment or create new objects. The user may also select various commands from the command menus. Other functions may be performed in the virtual environment such, for example, as drawing curves. Traditional input devices are extremely difficult to use in such a virtual environment because traditional devices control only two degrees of freedom and, thus, a combination of several input devices or, with a single device, more than one operation, is required to control three or more degrees of freedom as is necessary in three-dimensional applications. Such a combination control scheme is cumbersome, unintuitive and requires significant training on the user's part. The Segen system provides for three degrees of freedom which is more than adequate for issuing commands, but may not be sufficient for use in certain three-dimensional applications where interaction with three-dimensional objects is necessary.

It would thus be desirable to provide a computer interface that enables common and intuitive hand gestures and hand motions to be used for interacting with a three-dimensional virtual environment. It would further be desirable to provide a system and method for tracking hand gestures and hand motions in a three-dimensional coordinate system with five degrees of freedom.

SUMMARY OF THE INVENTION

This invention relates to the use of images input to a computer for effectuating computer control. The present invention provides a system and method for tracking the three-dimensional position and orientation of a finger of the user's hand with five degrees of freedom. The tracking of the user's finger by the inventive system enables the user to utilize and control computer applications requiring three-dimensional interaction.

The system includes a computer for controlling operation of the system, having image processing capabilities and a display for displaying a virtual environment to a user, and at least two video input devices, such as video cameras, connected to the computer for acquiring video images and for enabling the computer to operatively identify, interpret, and track motions and gestures of a user's hand made by the user within an identification zone monitored by the video input devices (hereinafter "cameras"). The identification zone is an area that is typically, although not necessarily, near the computer system towards which the first and second cameras are oriented. The configuration and functionality of the cameras and the computer are similar to the above-incorporated Segen system, except that while the Segen system employs only a single camera, the system of the present invention utilizes two or more cameras.

It should be noted that while the inventive system is largely based on the above-incorporated Segen system, the system of the present invention provides important additional inventive features that are essential for enabling the user to control applications requiring three-dimensional interaction. These additional features are possible because the inventive system uses two or more cameras to simultaneously capture images of the user's hand, while the Segen system employs only a single camera to capture a single image.

During operation of the system, hand images from the cameras are continually converted to a digital format and input to the computer for processing. As in the Segen system, the results of the processing and attempted recognition of each image are then sent to an application or the like for performing various functions or operations. However, when the inventive computer recognizes a hand gesture as a "point" gesture with one finger extended, the computer uses information derived from the images to track three-dimensional coordinates of the extended finger of the user's hand with five degrees of freedom. Essentially, the computer utilizes two-dimensional images obtained by each camera to derive three-dimensional position (in an x, y, z coordinate system) and orientation (azimuth and elevation angles) coordinates of the extended finger. This feature is not possible in the Segen system because at least two cameras are necessary to generate the information required for three-dimensional position and orientation tracking. Thus, the present invention provides an advantageous supplement to the functionality of the Segen system because, in addition to issuing commands to a computer using hand gestures (as described in detail in Segen), the inventive system enables user control of applications that require three-dimensional interaction.

The inventive method of tracking three-dimensional coordinates of the user's finger with five degrees of freedom is performed as follows. Initially, the two cameras are calibrated to derive a perspective projection matrix for each camera. The computer then simultaneously acquires a first image of the user's hand from the first camera and a second image of the user's hand from the second camera. The images are then classified by the computer to identify the class of each image. This classification process is performed in the same manner as in the Segen system. Once the class of each image is identified, the computer determines whether both images belong to the "point" class (where one of the user's fingers is extended) and, in the process of doing so, also identifies a portion of each image corresponding to the user's extended finger, such as the index finger. If both images belong to the "point" class, the computer determines pixel coordinates of the "tip" of an extended finger of the user's hand and the orientation angle of the extended finger's axis for each of the two images in accordance with the pixel coordinate and orientation angle determination technique used by the Segen system.

The computer first generates a first virtual line from the first image pixel coordinates of the tip of the extended finger of the user's hand and the orientation angle of the extended finger's axis, and similarly generates a second virtual line from the second image pixel coordinates and orientation angle. The computer then determines the three-dimensional coordinates of the tip of the extended finger by locating a virtual intersection of the first and second virtual lines that corresponds to the fingertip's three-dimensional position. Thus, the computer tracks the three-dimensional coordinates of the tip of the user's extended finger by generating the first and second virtual lines and determining, for each first and second image frame, the coordinates of the virtual intersection.

To determine the three-dimensional orientation of the extended finger, i.e. the azimuth and elevation angles, the computer generates, for the first image, a first parameter vector representative of a first three-dimensional virtual plane containing the axis of the extended finger as viewed from the position of the first camera. The computer also generates, for the second image, a second parameter vector representative of a second three-dimensional virtual plane containing the axis of the extended finger as viewed from the position of the second camera. The computer then generates the first and second virtual planes and determines a third virtual line corresponding to a line formed by intersection of the first and second virtual planes. Finally, the computer derives the azimuth and elevation angles of the extended finger from the parameters of the third virtual line. Thus, the computer tracks the three-dimensional orientation of the user's extended finger by generating the first and second virtual planes lines and determining, for each first and second image frame, the parameters of the third virtual line formed by the intersection of the first and second virtual planes.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote corresponding or similar elements throughout the various figures.

DETAILED DESCRIPTION OF THE CURRENTLY PREFERRED EMBODIMENTS

The system and method of the present invention are based on the above incorporated Segen system and preferably include substantially all of the functionality of the Segen system. Accordingly, certain functions of the Segen system that are used in the inventive system are not described in detail herein. While incorporating the functionality of the Segen system, the system of the present invention provides important additional inventive features that cannot be implemented in the Segen system and that are essential for enabling user control of applications requiring three-dimensional interaction. In particular, the system of the present invention provides three-dimensional tracking of a user's finger with five degrees of freedom.

To facilitate a better understanding of the inventive system it would be helpful to provide a summary of the Segen system on which the inventive system is based. In summary, the Segen system comprises a video input device, such as a camera, for capturing images of a user's hand, that is connected to a computer with image processing capabilities for operatively interpreting the received images. The image processing capabilities of the computer act upon predetermined recognized hand gestures as computer commands. Hand images from the camera are converted to a digital format and input to the computer for processing. The results of the processing and attempted recognition of each image are sent to an application or the like for performing various functions or operations. The process of identifying a hand gesture in an image frame is illustratively performed by conducting a region extraction step which defines a set of regions containing or possibly containing an image of a hand in a video frame of a video input signal. The set of regions in the image is then processed by a screening step which detects and selects one of the defined regions of the image as a hand image (i.e. identifies one of the regions in the image as a hand). If a hand image is thereby identified, then the set of localized features of the hand image is computed from the boundary of the selected hand region. The boundary of the hand region is thereafter analyzed to correlate the boundary data with one of a stored plurality of hand gestures. Once a particular gesture is determined or identified in the frame, an application or operation associated with the identified gesture is performed by or under the control of the computer. When the identified gesture is a pointing gesture, the Segen system also determines pixel coordinates p(x, y) of the tip and the orientation angle ϑ of the user's extended finger.

Figure 1:
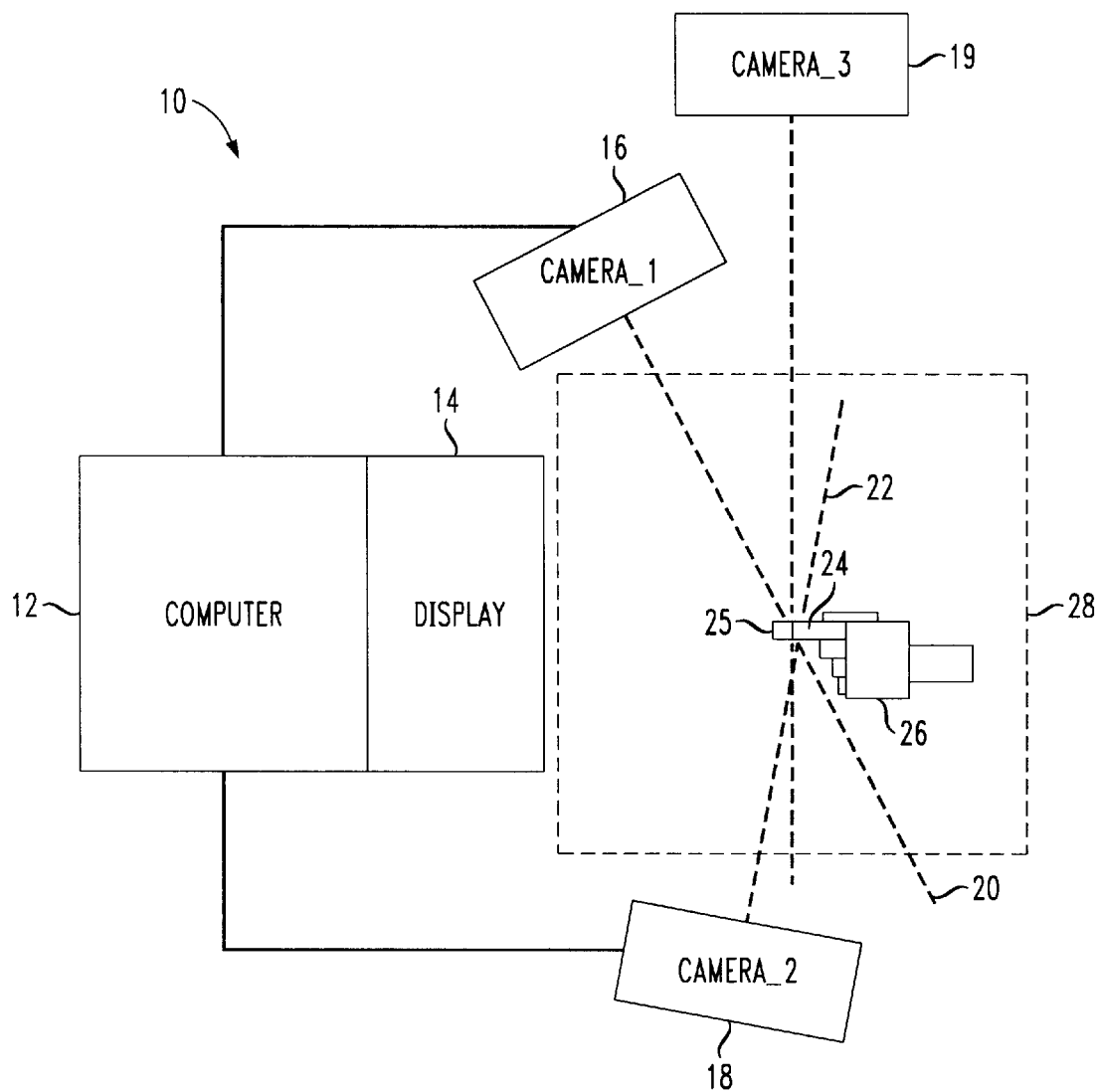
FIG. 1 is a block diagram of a video hand image three-dimensional computer interface system in accordance with the present invention.

Referring now to the drawings, and initially to FIG. 1 thereof, a video gesture-based three-dimensional interface system 10 is there shown. The system 10 is formed of or includes a computer 12, such as a personal computer or a workstation, for controlling the system's operation, a display unit 14, such as a display monitor, for displaying a three-dimensional environment to a user, and a pair of video acquisition devices, such as cameras, 16 and 18, connected to computer 12, for monitoring a predefined identification zone 28 to enable the computer 10 to identify hand gestures and movements made by a user's hand 26, finger 24, and fingertip 25 within the identification zone 28 and for converting the hand gestures and hand movements to digital signals that are preferably interpreted as various commands. A lens axis 20 is representative of the orientation of the camera 16; similarly, a lens axis 22 is representative of the orientation of the camera 18. The cameras 16 and 18 are preferably synchronized to work in unison so that, at any given time, the images from all of the cameras correspond to the same scene.

While the system 10 is described herein with specific reference to a pair of cameras 16 and 18 connected to the computer 10, it should be understood that three or more cameras may be connected to the computer 10 and oriented to observe the user's hand 26 within the identification zone 28 without departing from the spirit of the invention. For example, a third camers 19 may be attached to the computer 12 and also oriented toward the identification zone 28. Preferably, the identification zone 28 is defined in an area proximate to the user so that the user may comfortably make desired hand gestures and movements within the zone 28. Proximity of the identification zone 28 to the display unit 14, while often convenient or desirable, is not required. Furthermore, while the system 10 is described herein with specific reference to the user's hand 26, finger 24, and fingertip 25, it should be understood that another elongated object with a tip may be used as a substitute for the user's hand 26 and extended finger 24 without departing from the spirit of the invention.

The operation of the system 10 is generally controlled by a control program stored in a memory (not shown) of the computer 12 and executed by the computer. This control program typically consists of multiple integrated program modules, with each module bearing responsibility for controlling one or more functions of the system 10. For example, one program module may provide one or more functions of the Segen system, such as identifying a hand gesture in an image frame, while another module may control determination of pixel coordinates of a finger 24 of the user's hand 26. In effect, each program module is a control program dedicated to a specific function or set of functions of the system 10.

Figure 2:
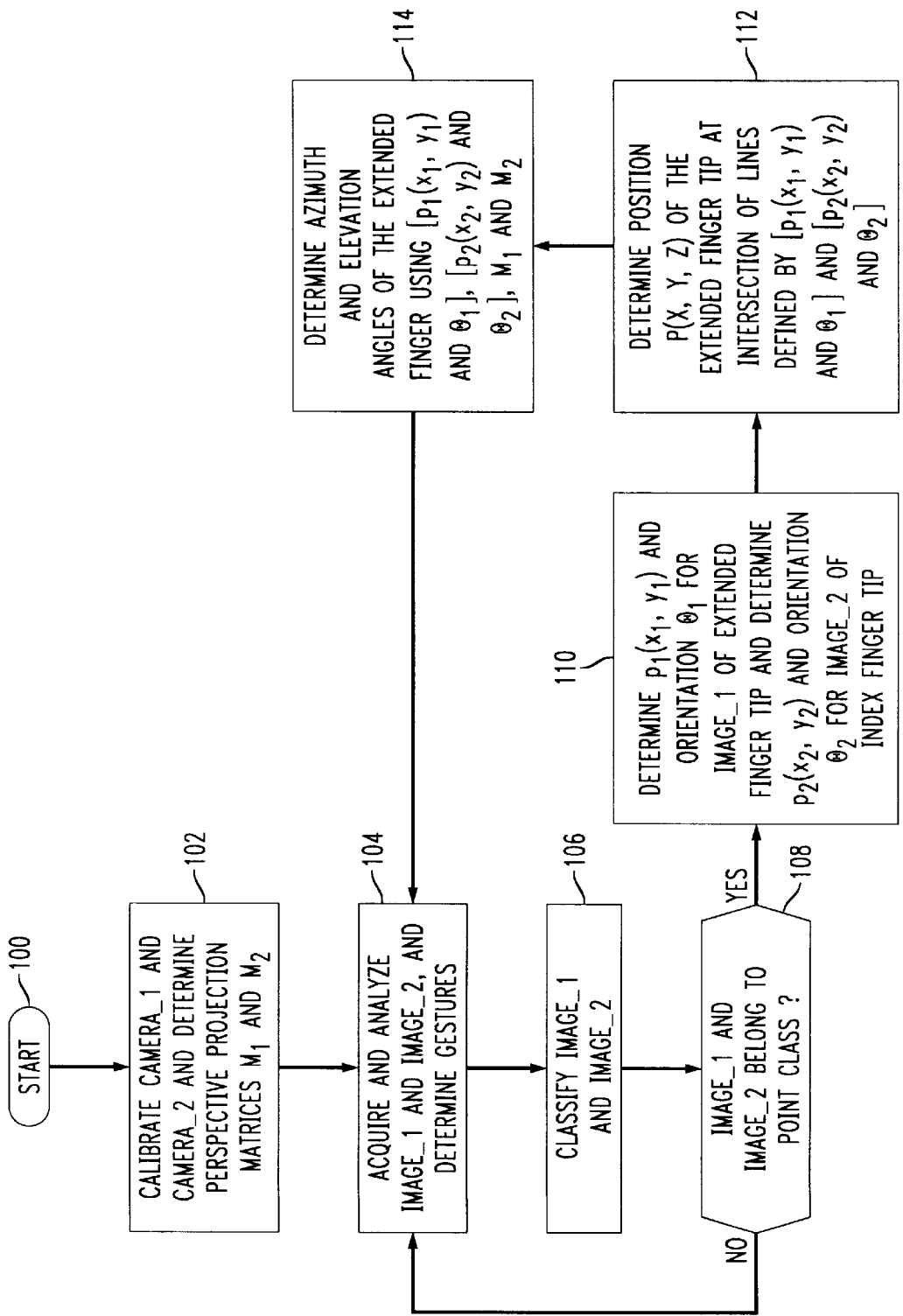
FIG. 2 is a logic flow diagram of a three-dimensional position and orientation tracking control program executed by the computer of the system of FIG. 1, in accordance with the principles of the present invention.

FIG. 2 depicts a logic flow diagram representing the control program, executed by the computer 12 of FIG. 1 in accordance with the present invention, for controlling the identification and interpretation of the user's hand gestures and for tracking three-dimensional position and orientation coordinates of an extended finger 24 of the user's hand 26 with five degrees of freedom. Preferably, the control program is executed in conjunction with a Segen system program module that correlates a predetermined hand gesture to the identified hand image for effectuating a particular computer operation or function. Thus, in effect the present invention incorporates the most important feature of the Segen system, i.e. the correlation of a hand image to a hand gesture and effectuation of a computer command associated with the gesture, in addition to the advantageous features of the present invention described below in connection with FIG. 2. The correlation program module is not shown herein, but is described in detail in the above-incorporated co-pending Segen application.

The computer 12 first initializes the system 10 at a step 100 and then proceeds to a step 102 at which the cameras 16 and 18 are calibrated to determine perspective projection matrices $M_1$ and $M_2$, respectively. The matrices $M_1$ and $M_2$, are used by the computer 12 to compensate for any differences between internal parameters and external parameters of the respective cameras 16 and 18. Camera calibration is a complex task that may be performed in accordance with any of a variety of well known calibration approaches. However, it may prove helpful to describe a preferred approach as is done below. The image of a scene observed by a camera is generated in accordance with two types of parameters called internal parameters and external parameters. Internal parameters include the focal length of the camera lens, the distance between the pixels, size of each pixel and lens distortion coefficients. External parameters include the camera's position and orientation relative to the scene observed by the camera or with respect to a user-defined "real world" coordinate system. These parameters determine the image pixel coordinates (x, y) in a camera image plane, a pixel representation of the scene observed by the camera, that correspond to a three-dimensional point (X, Y, Z) in the real world coordinate system.

Figure 3:
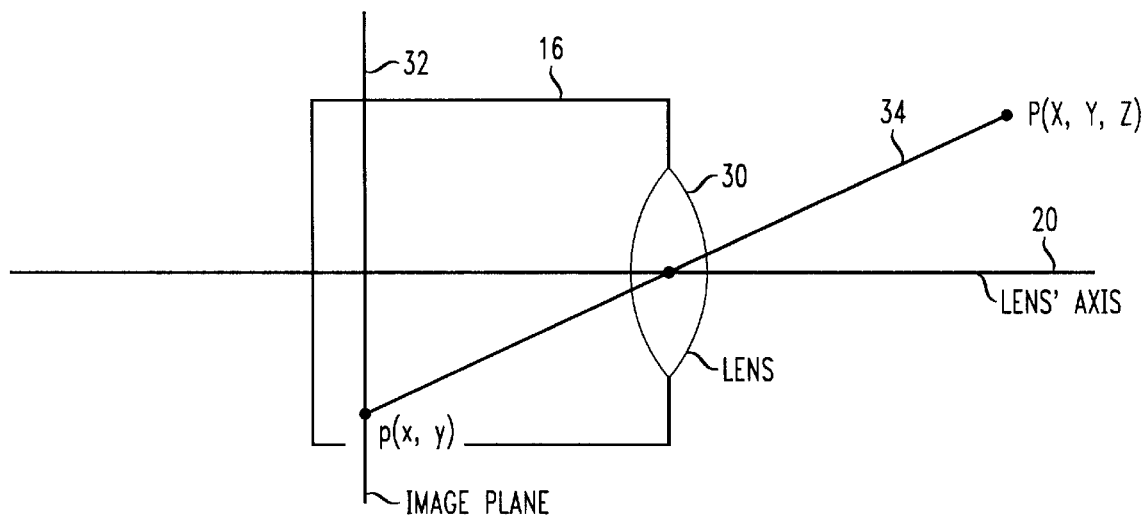
FIG. 3 is a diagram of a relationship between a pixel position in an image plane and a point in real space with respect to a lens of a camera of the computer interface system of FIG. 1.

This arrangement is illustrated in FIG. 3 in perspective projection form for the camera 16. Light bouncing off of a three-dimensional point P(X, Y, Z) in the real world passes through the center of a camera lens 30 along a line 34 and meets an image plane 32 at pixel location p(x, y) to form the image of point P. A three-dimensional point can potentially lie anywhere along the line 34 and still be imaged at point P. When a camera's internal and external parameters are known it is possible to trace the line 34 for each image point p(x, y) backwards through the lens 30 center into the 3D world. In other words, for each image point p, we can compute the line 34 in the world coordinate system on which the corresponding three-dimensional point P should lie. It should be noted that when using a single camera 16, only the line 34 may be computed—the computer 12 cannot determine the exact position of three-dimensional point P along line 34. In order to determine the exact three-dimensional coordinate position of point P, at least two cameras 16 and 18 are necessary, as described below in connection with FIG. 5.

Calibration of a camera typically involves determining a perspective projection matrix M that encapsulates the camera's internal and external parameters using data derived from a perspective projection arrangement as shown in FIG. 3 and described above. There are several known approaches for determining the matrix M of a camera. A superior approach is shown below as Equation 1.

Mathematically, the matrix M can be derived from the relationship between the coordinates of three-dimensional point P (X, Y, Z) and image point p (x, y) which can be expressed as follows:

$$[s^*x, s^*y, s]^T = M^*[X, Y, Z, 1]^T \qquad \text{[Equation 1]}$$

where M is a 4×4 perspective projection matrix, 's' is a scale parameter and [. . . ]^T denotes matrix transpose. Preferably, the computer 12 determines the matrices $M_1$ and $M_2$ for the cameras 16 and 18, respectively, in accordance with Equation 1. Alternately, the camera calibration may be performed using other well-known techniques that do not require determination of the matrices $M_1$ and $M_2$.

At a step 104, the computer 12 acquires IMAGE_1 of the user's hand 26 from a current image frame of the camera 16 and IMAGE_2 of the user's hand 26 from the current image frame of camera 18. The computer 12 also analyzes IMAGE_1 and IMAGE_2 to determine whether each of the images contains a hand gesture made by the user's hand 26. The image acquisition and analysis to determine presence of hand gestures is performed in a similar manner to the Segen system as described above, except that two images IMAGE_1 and IMAGE_2 are obtained and analyzed instead of a single image. Once presence of a hand gesture is determined in each image IMAGE_1 and IMAGE_2. the computer 12 proceeds to a step 106.

At step 106, the computer 12 classifies the hand gesture in each image IMAGE_1 and IMAGE_2 as belonging to a particular predetermined class of hand gestures. The system 10 recognizes four classes of hand gestures:

(1) POINT: This class corresponds to a gesture in which one finger 24 (typically, the index finger) of the user's hand 26 is extended while the other fingers are closed. Preferably, if the user extends two proximal fingers, then the computer 12 identifies a left of the two fingers as a primary extended finger when the hand 26 is a right hand, and identifies a right of the two fingers as a primary extended finger when the hand 26 is a left hand.

(2) REACH: This class corresponds to the gesture in which all of the fingers of the hand 26 are outstretched or extended.

(3) FIST: This class corresponds to a gesture in which the hand 26 is closed to form a fist.

(4) GROUND: This class covers all other gestures and the case where the hand 26 is not visible.

Once each hand gesture in IMAGE_1 and IMAGE_2 is classified, the computer 12 proceeds to a test 108, where it determines whether both hand gestures in IMAGE_1 and IMAGE_2 belong to the POINT class. If only one hand gesture in IMAGE_1 and IMAGE_2 belongs to the POINT class, then the computer 12 returns to the step 104 to acquire a next set of images IMAGE_1 and IMAGE_2 corresponding to a next image frame in each respective camera 16 and 18. Similarly if neither hand gesture in IMAGE_1 and IMAGE_2 belongs to the POINT if class, then the computer also returns to the step 104. On the other hand, if both hand gestures in IMAGE_1 and IMAGE_2 belong to the POINT class, then computer 12 proceeds to a step 110.

Figure 4:
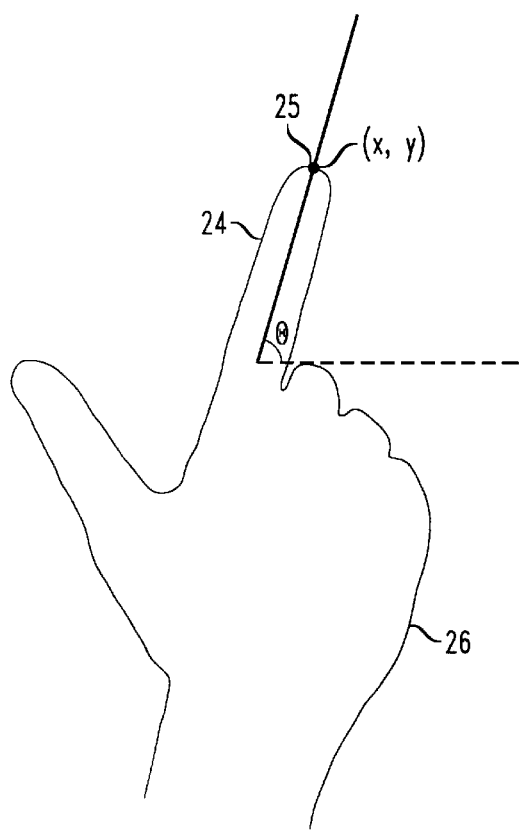
FIG. 4 is a representation of the coordinates of a user's extended finger in the image coordinate system.

At the step 110, the computer 12 identifies and locates the fingertip 25 of the extended finger 24, preferably in accordance with the fingertip identification technique used by the Segen system. Identification of the fingertip 25 is important because the user uses the fingertip 25 to point out and manipulate three-dimensional objects in a computer application requiring three-dimensional interaction. The computer 12 then determines a first set of pixel coordinates $p_1(x_1,y_1)$ of the fingertip 25 and an orientation angle $\vartheta_1$ of the finger 24 from IMAGE_1, and also determines a second set of pixel coordinates $p_2(x_2,y_2)$ of the fingertip 25 and an orientation angle $\vartheta_2$ of the finger 24 from IMAGE_2. A diagram representing exemplary coordinates and orientation angle is shown in FIG. 4. Preferably, the determination of pixel coordinates and the orientation angle for each image is performed in accordance with the technique used by the Segen system.

Figure 5:
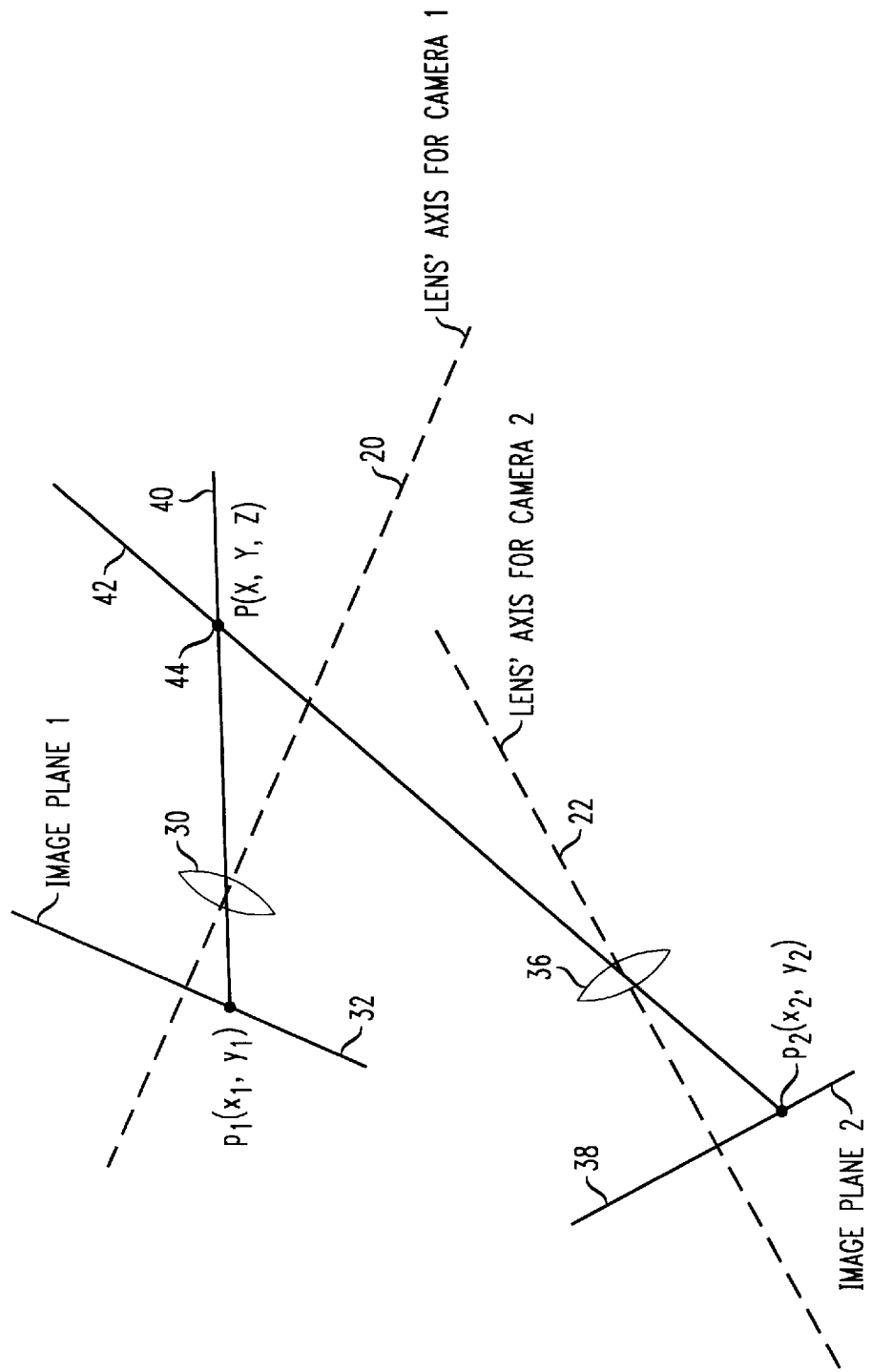
FIG. 5 is a diagram of an image plane and lens axis of each of the lenses of the cameras of the computer interface system of FIG. 1.

Given $p_1(x_1,y_1)$ from IMAGE_1, and $p_2(x_2,y_2)$ of IMAGE_2, the first objective of the computer 12 is to determine P(X, Y, Z) i.e. the three-dimensional coordinates of a point P in the real world scene in the identification zone 28 that corresponds to the actual position of the fingertip 25 in the scene. At a step 112, the computer 12 determines P(X,Y,Z) from the pixel point coordinates $p_1(x_1,y_1)$ and $p_2(x_2,y_2)$ as follows. Referring to FIG. 5, the image plane 32, lens 30, and lens axis 20 of the camera 16 are shown along with an image plane 38, lens 36, and lens axis 22 of the camera 18. The pixel point coordinates $p_1(x_1,y_1)$ and $p_2(x_2, y_2)$ are shown on image planes 32 and 38, respectively. The computer 12 computes the parameters of a first virtual line 40 using any well-known geometric line equation with parameters corresponding to $p_1(x_1,y_1)$, and similarly generates the parameters of a second virtual line 42 using parameters corresponding to $p_2(x_2,y_2)$. The computer 12 then determines P(X, Y, Z) by locating a "virtual intersection" 44 of the virtual lines 40 and 42 that corresponds to the fingertip 25 three-dimensional position. By "virtual intersection" of two lines, we mean a point that is equidistant from both lines while being as close to each line as possible. Thus, the computer 12 continually tracks the three-dimensional coordinates P(X, Y, Z) of the fingertip 25 by generating the parameters of virtual lines 40 and 42 and determining, for each image frame of IMAGE_1 and IMAGE_2, the coordinates of the virtual intersection 44.

Given $p_1(x_1,y_1)$, $\vartheta_1$ from IMAGE_1, and $p_2(x_2,y_2)$, $\vartheta_2$ from IMAGE_2, the second objective of the computer 12 is to determine AZIMUTH and ELEVATION angles of the finger 24, that together with the point P coordinates X, Y, and Z enable the system 10 to track the user's hand 26 and finger 24 with five degrees of freedom. At a step 114, the computer 12 determines a first parameter vector representative of a first three-dimensional virtual plane defined along a first projected axis of the finger 24 derived by the computer 12 from IMAGE_1, and also generates a second parameter vector representative of a second three-dimensional virtual plane defined along a second projected axis of the finger 24 derived by the computer 12 from IMAGE_2. The computer 12 then generates the parameters of the first and second virtual planes in accordance with the respective first and second parameter vectors and determines an intersection line corresponding to a line formed by intersection of the first and second virtual planes. The computer then derives AZIMUTH and ELEVATION angles of the finger 24 from parameters of the intersection line using a set of any well-known trigonometric angle determination expressions. Thus, the computer 12 continually tracks the three-dimensional orientation (AZIMUTH and ELEVATION angles) of the finger 24 by generating the parameters of the first and second virtual planes and determining, for each image frame of IMAGE_1 and IMAGE_2, the parameters of the intersection line formed by the intersection of the first and second virtual planes. The computer 12 then returns to step 104 where image frames of IMAGE_1 and IMAGE_2 are acquired.

While there are a number of well known mathematical approaches for determining the above-described first and second parameter vectors from $p_1(x_1,y_1)$, $\varphi_1$ and $p_2(x_2,y_2)$, $\varphi_2$ respectively, an exemplary approach is illustrated below.

A line in a two dimensional plane can be represented by the equation $$a*x+b*y+c=0 \quad \text{[Equation 2]}$$

where (x,y) is an arbitrary point on the line and where a, b and c denote the parameters of the line. Equation 2 can be expressed in matrix notation as $$v^T*u=0 \quad \text{[Equation 3]}$$

where v=[x, y, 1]^T and u=[a, b, c]^T. The vector u denotes the parameters of the line and [. . . ]^T denotes matrix transpose.

Similarly, a three-dimensional plane may be represented by the equation $$a'*x+b'*y+c'*z+d'=0 \quad \text{[Equation 4]}$$

where (x, y, z) is an arbitrary point on the three-dimensional plane and where a', b', c', and d' denote the parameters of the plane. In matrix notation, the above equation becomes $$v'^T*u'=0 \quad \text{[Equation 5]}$$

where v'=[x, y, z, 1]^T and u'=[a', b', c'd']^T. The vector u' denotes the parameters of the line.

Given an image $p_1(x_1,y_1)$, of the fingertip 25 and its orientation ($\varphi_1$) in IMAGE_1, an image line representing the projected axis of the finger 24, as it appears in IMAGE_1, has the parameters given by:

$$a=\cos(\varphi_1), b=-\sin(\varphi_1), \text{ and } c=y_1*\sin(\varphi_1)-x_1*\cos(\varphi_1). \quad \text{[Equations 6]}$$

Hence, in accordance with Equation 3, the projected axis may be expressed as follows:

$$v^T*u=0 \quad \text{[Equation 7]}$$

where v=[x, y, 1]^T, u=[cos($\varphi_1$), -sin($\varphi_1$), $y_1*\sin(\varphi_1)-x_1*\cos(\varphi_1)$] and where (x, y) is an arbitrary point on the projected axis.

Multiplying both sides of Equation 7 by a scale factor "s", the equation may be rewritten as:

$$w^T*u=0 \quad \text{[Equation 8]}$$

where w=[s*x, s*y, s]^T.

An arbitrary three-dimensional point (X, Y, Z) in the real world coordinate system is then selected. The relationship between the "real-world" point (X, Y, Z) and the image point p(x,y) is shown in Equation 1. Equation 1 may be rewritten in a matrix notation as:

$$w=M1*W \quad \text{[Equation 9]}$$

where w=[s*x, s*y, s]^T, W=[X, Y, Z, 1] and $M_1$ is the projection matrix determined at the step 102 for camera 16.

Since point (x, y) lies on the projection axis of finger 24, it satisfies Equation 8. Combining Equations 8 and 9, the following equation is formed:

$$W^T*M1^T*u=0 \quad \text{[Equation 10]}$$

Comparing the above equation with Equation 4, the first parameter vector for the first three-dimensional virtual plane containing the projection axis of the finger 24 from IMAGE_1 may be determined as:

$$u'=M1^T*u \quad \text{[Equation 11]}$$

The above-described procedure is then similarly performed using $p_2(x_2,y_2)$, $\varphi_2$ to determine the second parameter vector for the second three-dimensional virtual plane.

Thus, while there have shown and described and pointed out fundamental novel features of the invention as applied to preferred embodiments thereof, it will be understood that various omissions and substitutions and changes in the form and details of the methods disclosed and devices illustrated, and in their operation, may be made by those skilled in the art without departing from the spirit of the invention. For example, although the preferred embodiment employs images of a hand to effectuate computer control, images of other objects may, likewise, be employed such, for example, as images of a pencil or other pointing-type object to mark or designate menu entries or features on a computer screen, etc. Accordingly, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. A method of tracking, in a real world scene, three-dimensional position coordinates and orientation angles of an object having an end portion, a tip and an axis, said method being implemented in a computer system having a first video acquisition device and a second video acquisition device for monitoring, from different positions, an identification zone defined in the real world scene, said method comprising the steps of:

(a) acquiring a first image of the object from the first video acquisition device and simultaneously acquiring a second image of the object from the second video acquisition device when the object is present in the identification zone;

(b) determining a first set of pixel coordinates corresponding to the tip of the object and a first orientation angle for the end portion of the object from said first image and determining a second set of pixel coordinates corresponding to the tip of the object and a second orientation angle for the end portion of the object from said second image;

(c) determining a first virtual line in the real world scene in accordance with said first set of pixel coordinates and a first perspective projection matrix defined in accordance with a monitoring orientation of the first video acquisition device, and determining a second virtual line in the real world scene in accordance with said second set of pixel coordinates and a second perspective projection matrix defined in accordance with a monitoring orientation of the second video acquisition device;

(d) determining the three-dimensional position coordinates of the object end portion by identifying coordinates of a virtual intersection of said first and second virtual (e) determining a first parameter vector representative of a first linear projection of the object axis from said first image in accordance with said first set of pixel coordinates and said first orientation angle, and determining a second parameter vector representative of a second linear projection of the object axis from said second image in accordance with said second set of pixel coordinates and said second orientation angle;

(f) determining parameters of a first virtual plane using said first parameter vector and said first perspective projection matrix, and defining a second virtual plane using said second parameter vector and said second perspective projection matrix; and (g) determining the three-dimensional orientation angles of the object by identifying orientation parameters of a third line defined by an intersection of said first and said second virtual planes.

2. The method of claim 1, further comprising the step of:
(h) prior to said step (a), calibrating the first and second video acquisition devices.

3. The method of claim 1, further comprising an additional video acquisition device connected to the computer and oriented toward the identification zone, wherein:

said step (a) further comprises acquiring a third image of the object from the third video acquisition device when the object is present in the identification zone;

said step (b) further comprises determining a third set of pixel coordinates and a third orientation angle for the end portion of the object from said third image;

said step (c) further comprises determining a third virtual line in the real world scene in accordance with said third set of pixel coordinates and said third orientation angle;

said step (d) further comprises determining the three-dimensional position coordinates of the object end portion by identifying coordinates of a virtual intersection of said first, second, and third virtual lines;

said step (e) further comprises determining a third parameter vector representative of a third linear projection of the object axis from said third image in accordance with said third set of pixel coordinates and said third orientation angle;

said step (f) further comprises determining parameters of a third virtual plane using said third parameter vector and a third perspective projection matrix defined in accordance with the orientation of said additional video acquisition device; and said step (g) further comprises determining the three-dimensional orientation angles of the object by identifying orientation parameters of a third line defined by an intersection of said first, second, and third virtual planes.

4. The method of claim 1, wherein said orientation angles comprise azimuth and elevation angles.

5. The method of claim 1, wherein said object is a user's hand and wherein said end portion is the user's extended finger.

6. A method of tracking, in a real world scene, three-dimensional position coordinates and orientation angles of a user's hand and of the user's extended finger having an axis and a tip, in a real world scene, said method being implemented in a computer system having a first video acquisition device and a second video acquisition device for monitoring, from different positions, an identification zone defined in the real world scene, said method comprising the steps of:

(a) acquiring a first image of the user's hand from the first video acquisition device and simultaneously acquiring a second image of the user's hand from the second video acquisition device when the user's hand is disposed within the identification zone;

(b) analyzing said first and second images to determine whether both said first and second images correspond to a pointing gesture of the user's hand wherein one of the fingers of the hand is extended, and (1) when both said first and second images are determined to correspond to the pointing gesture of the user's hand, identifying an end portion of the extended finger on each of said first and second images;

(2) when only one of said first and second images is determined to correspond to the pointing gesture of the user's hand, repeating said step (a); and (3) when both said first and second images are determined to not correspond to the pointing gesture of the user's hand, repeating said step (a);

(c) determining a first set of pixel coordinates corresponding to the tip of the extended finger and a first orientation angle for the end portion of the extended finger from said first image and determining a second set of pixel coordinates corresponding to the tip of the extended finger and a second orientation angle for the end portion of the extended finger from said second image;

(d) determining a first virtual line in the real world scene in accordance with said first set of pixel coordinates and a first projection matrix defined in accordance with a monitoring orientation of the first video acquisition device, and determining a second virtual line in the real world scene in accordance with said second set of pixel coordinates and a second projection matrix defined in accordance with a monitoring orientation of the second video acquisition device;

(e) determining the three-dimensional position coordinates of the extended finger end portion by identifying coordinates of a virtual intersection of said first and second virtual lines;

(f) determining a first parameter vector representative of a first linear projection of the finger axis from said first image in accordance with said first set of pixel coordinates and said first orientation angle, and determining a second parameter vector representative of a second linear projection of the finger axis from said second image in accordance with said second set of pixel coordinates and said second orientation angle;

(g) determining the parameters of a first virtual plane using said first parameter vector and said first projection matrix, and determining a second virtual plane using said second parameter vector and said second projection matrix; and (h) determining the three-dimensional orientation angles of the extended finger by identifying orientation parameters of a third line defined by an intersection of said first and said second virtual planes.

7. The method of claim 6, further comprising the step of:
(i) prior to said step (a), calibrating the first and the second video acquisition devices.

8. The method of claim 6, further comprising an additional video acquisition device connected to the computer and oriented toward the identification zone, wherein:

said step (a) further comprises acquiring a third image of the user's hand from the third video acquisition device when the extended finger, is present in the identification zone;

said step (c) further comprises determining a third set of pixel coordinates corresponding to the tip of the extended finger and a third orientation angle for the end portion of the extended finger from said third image;

said step (d) further comprises determining a third virtual line in the real world scene in accordance with said third set of pixel coordinates and said projection matrix;

said step (e) further comprises determining the three-dimensional position coordinates of the extended finger end portion by identifying coordinates of a virtual intersection of said first, second, and third virtual lines;

said step (f) further comprises determining a third parameter vector representative of a third linear projection of the extended finger axis from said third image in accordance with said third set of pixel coordinates and said third orientation angle;

said step (g) further comprises computing parameters of a third virtual plane using said third parameter vector and a third projection matrix defined in accordance with the orientation of the additional video acquisition device; and said step (h) further comprises determining the three-dimensional orientation angles of the extended finger by identifying orientation parameters of a third line defined by an intersection of said first, second, and third virtual planes.

9. The method of claim 6, wherein said orientation angles comprise azimuth and elevation angles.

10. A system for tracking, in a real world scene, three-dimensional position coordinates and orientation angles of an object having an end portion, a tip and an axis, the system comprising:

a first video acquisition device and a second video acquisition device for monitoring, from different positions, an identification zone defined in the real world scene, and a computer connected to said first and second video acquisition devices and operable for:

acquiring a first image of the object from the first video acquisition device and simultaneously acquiring a second image of the object from the second video acquisition device when the object is present in the identification zone;

determining a first set of pixel coordinates corresponding to the tip of the object and a first orientation angle for the end portion of the object from said first image and determining a second set of pixel coordinates of the tip of the object and a second orientation angle for the end portion of the object from said second image;

determining a first virtual line in the real world scene in accordance with said first set of pixel coordinates and a first projection matrix defined by a monitoring orientation of said first video acquisition device, and defining a second virtual line in the real world scene in accordance with said second set of pixel coordinates and a second projection matrix defined by a monitoring orientation of said second video acquisition device;

determining the three-dimensional position coordinates of the object end portion by identifying coordinates of a virtual intersection of said first and second virtual lines;

determining a first parameter vector representative of a first linear projection of the object axis from said first image in accordance with said first set of pixel coordinates and said first orientation angle, and determining a second parameter vector representative of a second linear projection of the object axis from said second image in accordance with said second set of pixel coordinates and said second orientation angle;

computing parameters of a first virtual plane using said first parameter vector and said first projection matrix, and computing parameters of a second virtual plane using said second parameter vector and said second projection matrix; and determining the three-dimensional orientation angles of the object by identifying orientation parameters of a third line defined by an intersection of said first and said second virtual planes.

11. The system of claim 10, wherein said orientation angles comprise azimuth and elevation angles.

12. The system of claim 10, wherein said object is a user's hand and wherein said end portion is the user's extended finger.

13. A system for tracking, in a real world scene, three-dimensional position coordinates and orientation angles of a user's hand and of the user's extended finger having an axis, the system comprising:

a first video acquisition device and a second video acquisition device for monitoring, from different positions, an identification zone defined in the real world scene, and a computer connected to said first and second video acquisition devices operable for:

acquiring a first image of the user's hand from the first video acquisition device and simultaneously acquiring a second image of the user's hand from the second video acquisition device when the user's hand is disposed within the identification zone;

analyzing said first and second images to determine whether both said first and second images correspond to a pointing gesture of the user's hand wherein one of the fingers of the hand is extended, and (1) when both said first and second images are determined to correspond to the pointing gesture of the user's hand, identifying an end portion of the extended finger on each of said first and second images;

(2) when only one of said first and second images is determined to correspond to the pointing gesture of the user's hand, acquiring a next first image of the user's hand from the first video acquisition device and simultaneously acquiring a next second image of the user's hand from the second video acquisition device; and (3) when both said first and second images are determined to not correspond to the pointing gesture of the user's hand, acquiring a next first image of the user's hand from the first video acquisition device and simultaneously acquiring a next second image of the user's hand from the second video acquisition device;

determining a first set of pixel coordinates and a first orientation angle for the end portion of the extended finger from said first image, and determining a second set of pixel coordinates and a second orientation angle for the end portion of the extended finger from said second image;

determining a first virtual line in the real world scene in accordance with said first set of pixel coordinates and a first projection matrix defined in accordance with a monitoring orientation of said first video acquisition device, and determining a second virtual line in the real world scene in accordance with said second set of pixel coordinates and a second projection matrix defined in accordance with a monitoring orientation of said second video acquisition device;

determining the three-dimensional position coordinates of the extended finger end portion by identifying coordinates of a virtual intersection of said first and second virtual lines;

determining a first parameter vector representative of a first linear projection of the finger axis from said first image in accordance with said first set of pixel coordinates and said first orientation angle, and determining a second parameter vector representative of a second linear projection of the finger axis from said second image in accordance with said second set of pixel coordinates and said second orientation angle;

computing parameters of a first virtual plane using said first parameter vector and said first projection matrix, and computing parameters of a second virtual plane suing said second parameter vector and said second projection matrix; and determining the three-dimensional orientation angles of the extended finger by identifying orientation parameters of a third line defined by an intersection of said first and said second virtual planes.

14. The system of claim 13, wherein said orientation angles comprise azimuth and elevation angles.

* * * * *